United States Patent
Bonniau et al.

[11] Patent Number: 5,969,930
[45] Date of Patent: *Oct. 19, 1999

[54] DIFFERENTIAL PROTECTION DEVICE INCLUDING A RECTIFIER AND A TOROID HAVING A NANOCRYSTALLINE CORE

[75] Inventors: Michel Bonniau, Dzacy le fort; Marc Paupert, Chalon Sur Saone, both of France

[73] Assignee: Schneider Electric Industries, S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/930,963
[22] PCT Filed: Apr. 18, 1996
[86] PCT No.: PCT/FR96/00587
  § 371 Date: Oct. 3, 1997
  § 102(e) Date: Oct. 3, 1997
[87] PCT Pub. No.: WO96/33542
  PCT Pub. Date: Oct. 24, 1996

[30] Foreign Application Priority Data
  Apr. 18, 1995 [FR] France .................................. 9504850

[51] Int. Cl.[6] ...................................................... H02H 3/33
[52] U.S. Cl. .............................................. 361/113; 361/45
[58] Field of Search ................................ 361/36, 42, 44, 361/45, 87, 88, 93, 113

[56] References Cited

U.S. PATENT DOCUMENTS

| | | | |
|---|---|---|---|
| 3,614,534 | 10/1971 | Gross | 361/45 |
| 3,657,604 | 4/1972 | Willard | 361/45 |
| 4,366,520 | 12/1982 | Finke et al. | 361/45 |
| 4,378,579 | 3/1983 | Hudson, Jr. | 361/45 |

FOREIGN PATENT DOCUMENTS

| | | |
|---|---|---|
| 044999 | 2/1982 | European Pat. Off. . |
| 0085595 | 8/1983 | European Pat. Off. . |
| 0484698 | 5/1992 | European Pat. Off. . |
| 05633606 | 10/1993 | European Pat. Off. . |
| 656262 | 6/1986 | Sweden . |

*Primary Examiner*—Albert W. Paladini
*Assistant Examiner*—Kim Huynh
*Attorney, Agent, or Firm*—Parkhurst & Wendel, L.L.P.

[57] ABSTRACT

A differential protection device includes a current transformer comprising a toroid formed by a magnetic core, primary windings formed by the active conductors of the installation and a secondary winding at the terminals of which a differential fault signal is established when a differential fault occurs in the primary windings, a tripping relay of a current breaking apparatus, and a secondary connection circuit connecting the relay to the terminals of the secondary winding, the secondary connection circuit being arranged to bring about tripping when the signal exceeds a preset threshold. The above-mentioned secondary circuit comprises a full-wave rectifier and a capacitor, connected in parallel with the secondary winding of the toroid, and the magnetic core is made of a nanocrystalline material.

10 Claims, 5 Drawing Sheets

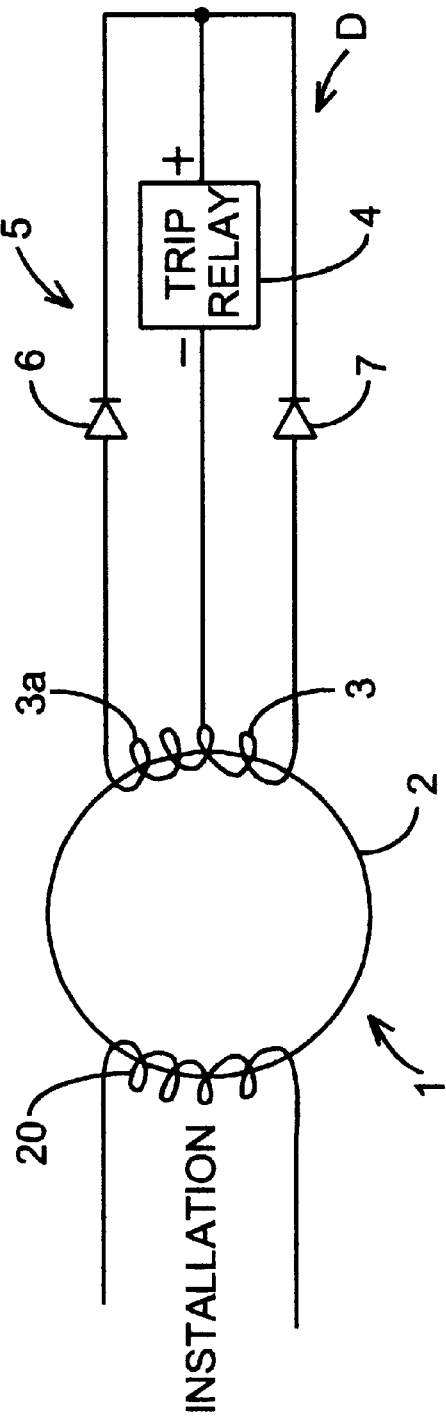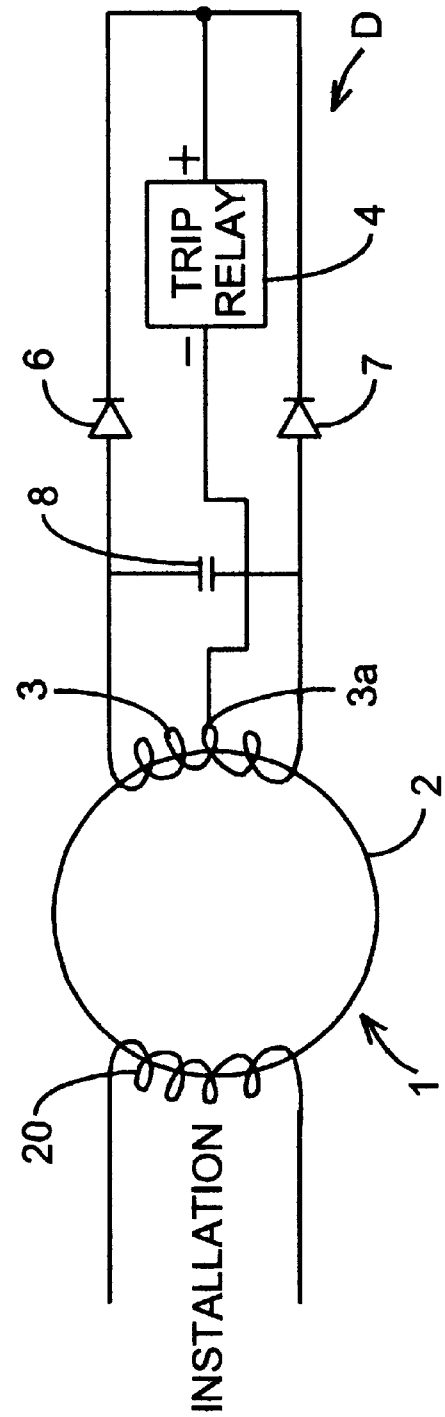
FIG. 2
FIG. 3

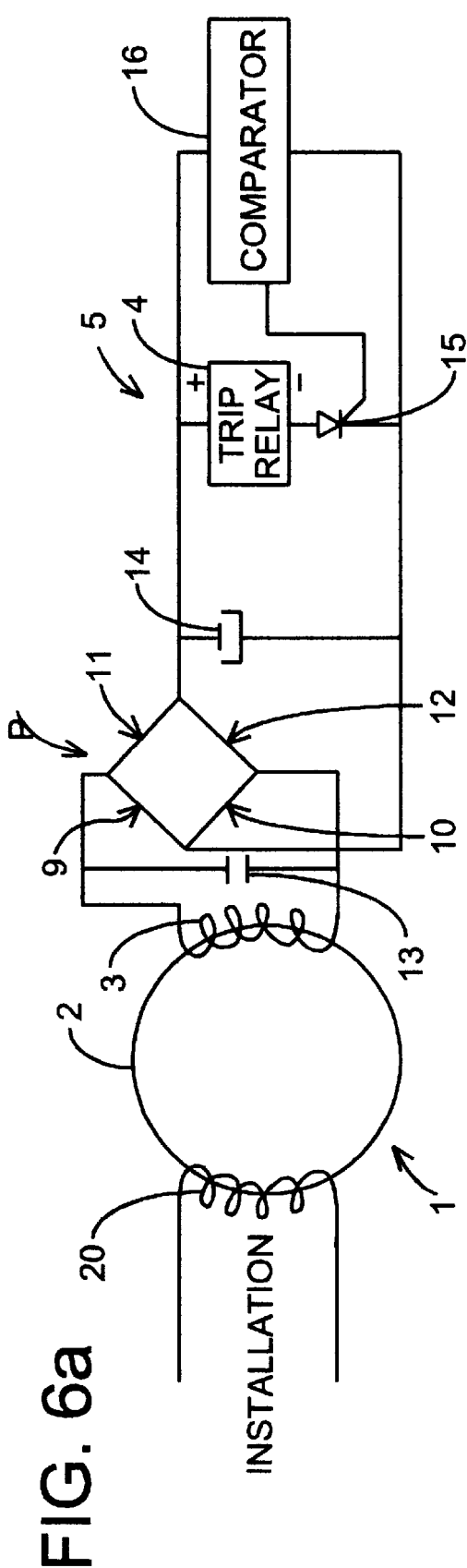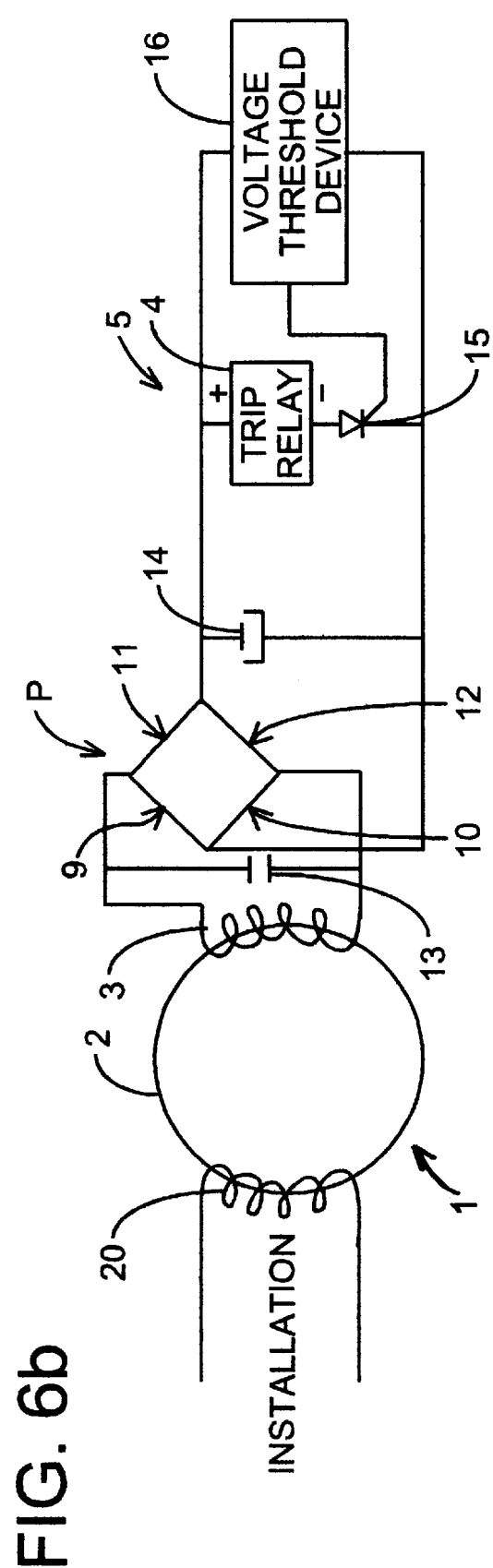
FIG. 6a
FIG. 6b

DIFFERENTIAL PROTECTION DEVICE INCLUDING A RECTIFIER AND A TOROID HAVING A NANOCRYSTALLINE CORE

BACKGROUND OF THE INVENTION

The present invention relates to a protection device of an electrical installation in which a tripping relay is activated when a fault signal in a differential transformer exceeds a preset threshold.

BRIEF DESCRIPTION OF THE PRIOR ART

Trip devices by fault current have been used for many years for protection of machines and people. For protection of people, the tripping current can be about 30 mA, whereas it is in a range of about 300 to 500 mA for protection of machines.

However, during the last few years, more and more electronic devices with current rectifier effect have been incorporated in numerous electrical apparatuses. These rectifier effects may generate a DC component liable to influence the operation of the differential device. The increased use of electronic trip devices, notably in household appliances, also requires the latter to respond in complete safety not only to alternating currents but also to pulsed DC fault currents. The limit values defined for trip devices of this kind have been set by the standard VDE 0664. Trip devices of the previously mentioned kind are known, which meet this specific requirement, wherein the magnetic core of the transformer toroid is made of a crystalline material designed for this use. The main quantities characteristic of these materials are the induction amplitude ^B for a sinusoidal excitation current, the static induction elevation $\Delta B$ stat for a half-wave rectified sinusoidal excitation current, and the dynamic induction elevation $\Delta B$ dyn for a full-wave rectified sinusoidal excitation current.

In these trip devices, it is known to fit a capacitor between the transformer secondary winding and the relay tripping winding in order to increase the sensitivity of the trip device by increasing the power at the level of the relay. An oscillating circuit is thus formed by the secondary winding and the capacitor. The resonance frequency of this oscillating circuit then has to be tuned with the frequency of the voltage in the secondary winding due to the fault current. Tuning of this resonant circuit is performed by defining the number of turns of the secondary winding based on the capacitance values prescribed for the capacitor, and the tripping conditions of the trip device are determined. However, the number of turns finally set simply represents a compromise between the different forms of fault current.

European Patent application EP-0,563,606 describes a current transformer for a trip device, enabling safe interruption of a user circuit subjected to pulsed currents to be obtained, tripping being performed in a manner practically independent from the form of the fault current. These results are obtained due to the use of a magnetic core made of a nanocrystalline material presenting the following magnetic characteristics: Br/Bs<0.3, $\Delta Bdyn>0.6T$, for a field intensity amplitude of 100mA/cm, $\Delta Bdyn$ max>0.7T and $\Delta Bdyn/^B>0.7$, these magnetic cores having been achieved in two stages.

The magnetic quantities presented in this patent are in fact interesting for a trip device setup using a capacitor. The presence of this capacitor and the fact of obtaining $\Delta Bdyn/^B>0.7$ enable a more symmetrical current form to be obtained on the secondary. In this case, the polarized electromagnetic trip device operates for two more symmetrical thresholds, which results in a greater ease of setting adjustment when manufacturing. However, although they are advantageous, these features are nevertheless constraining, as they require a particular treatment of the magnetic core materials.

Furthermore, in this patent, the trip device does not enable an efficient differential protection to be obtained for common applications such as graduators which can have very brief opening angles ranging from 135° to 180°.

SUMMARY OF THE INVENTION

The present invention overcomes these problems and proposes a differential protection device whose sensitivity to pulsed currents is improved without constraining magnetic characteristics or the magnetic core of the transformer toroid. The invention, in a particular embodiment, in addition enables a wider protection to be achieved, in pulsed currents, notably for angles $\alpha>135°$ concerning certain graduators.

For this purpose, the object of the present invention is to achieve a differential protection device of the kind previously mentioned, this device being characterized in that the above-mentioned secondary circuit comprises a rectifier and that the magnetic core of the toroid is formed by a nanocrystalline material.

According to a particular embodiment of the invention, the magnetic core is made from a soft magnetic iron based alloy made up of at least 50% of fine crystal grains of a size smaller than 100 nm and containing, in addition to an iron content greater than 60% of iron atoms, 0.5 to 2% of copper, 2 to 5% at least of one of the following metals, niobium, tungsten, tantalum, zirconium, hafnium, titanium and/or molybdenum, 5 to 14% of boron and 14 to 17% of silicon.

According to a particular embodiment, the above-mentioned rectifier comprises two diodes respectively connecting the two ends of the secondary winding to one of the ends of the coil of the relay whereas the other end of the coil is connected to a mid-point of the secondary winding.

Advantageously, the two diodes are Zener diodes.

According to another embodiment, the above-mentioned rectifier comprises a diode bridge connecting the two ends of the secondary winding to the terminals of the coil of the relay.

According to a particular feature, the secondary circuit comprises in addition a capacitor connected in parallel with the secondary winding of the toroid.

According to another feature, the voltage surge factor of the secondary circuit is about 3.5.

According to another feature, the resonance frequency of the circuit comprising the secondary winding of the toroid and the capacitor is about 120 Hz.

According to a particular feature, the secondary circuit comprises in addition a storage capacitor and a device for comparison connected to the storage capacitor and comprising a monitoring output connected to the control device of the relay, so as to supply a tripping signal to the relay if the value of the voltage of the capacitor is greater than a preset threshold.

Advantageously, the comparison device comprise a comparator or a voltage threshold diode.

Preferably, the control device of the relay comprise a thyristor.

BRIEF DESCRIPTION OF THE FIGURES

But other advantages and features of the invention will become more clearly apparent from the following description, referring to the accompanying drawings given as examples only and in which:

FIG. 2 illustrates a first embodiment of a trip device according to the invention;

FIG. 3 illustrates a second embodiment of a trip device according to the invention;

FIGS. 6a and 6b illustrate a third embodiment of a trip device according to the invention.

DETAILED DESCRIPTION

Figure 1:
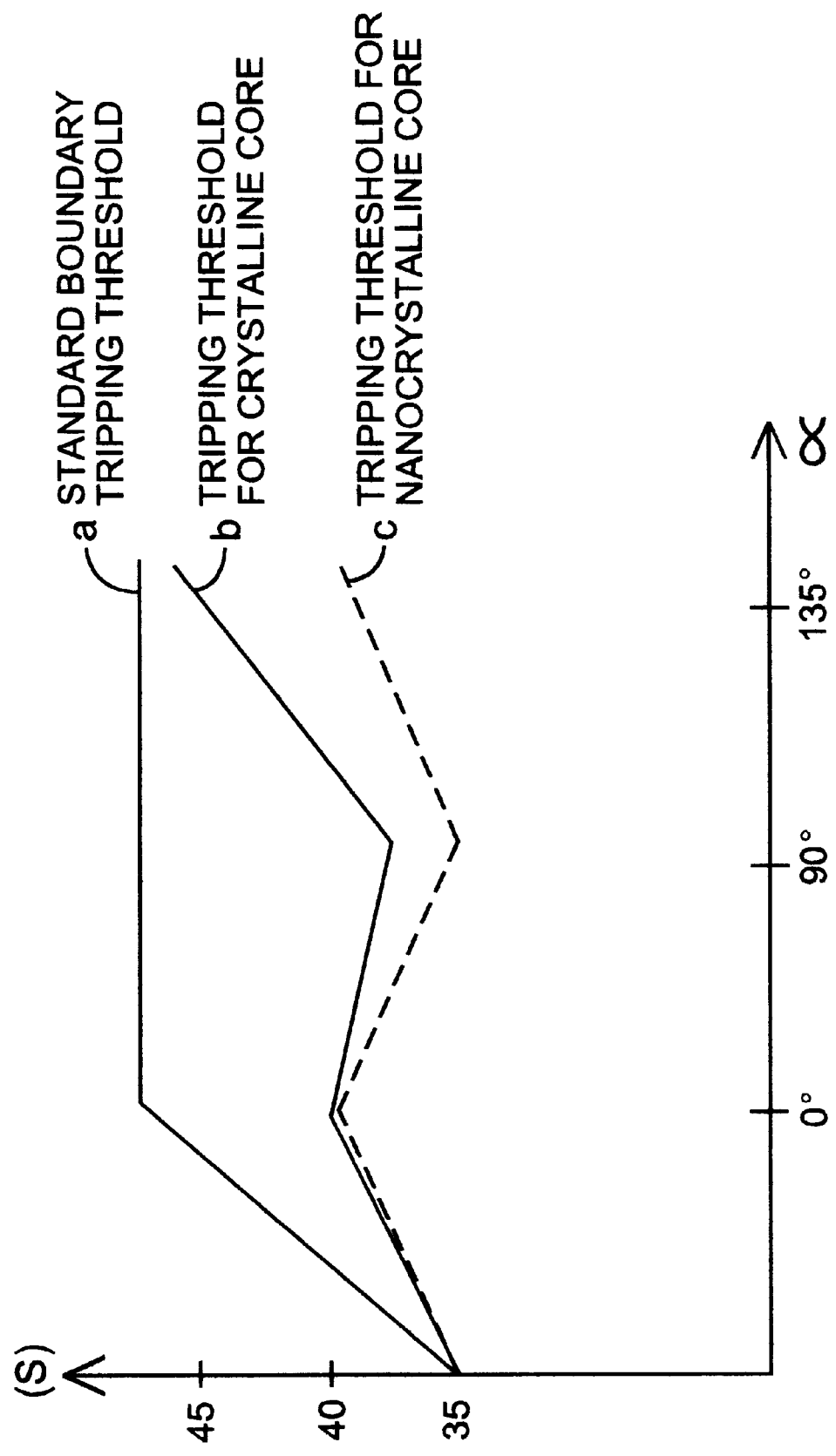
FIG. 1 is a curve representative of the variation of the tripping thresholds for a crystalline material and a nanocrystalline material.

In FIGS. 2, 3 and 6a and 6b, three embodiments can be seen respectively of a differential trip device D according to the invention designed to be incorporated in or associated for example to an electrical circuit breaker (not shown) for breaking the active conductors supplying an electrical installation. This device D comprises commonly to the three embodiments, a differential transformer 1 formed by a magnetic core toroid 2 comprising a primary winding 20 formed by the active conductors of the installation passing through the toroid 2, and a secondary winding 3 connected to the coil of a tripping relay 4 of the polarized type, by a secondary connecting circuit 5. The magnetic core of the toroid 2 is made of nanocrystalline material.

The secondary circuit 5 of the trip device D represented in FIG. 2 is formed by two diodes 6, 7 connected on input respectively to the two ends of the secondary winding 3 and on output to the positive pole of the tripping relay 4, whereas the negative pole of the relay 4 is connected to a mid-point 3a of the secondary winding 3 of the toroid 2. In the embodiment illustrated in FIG. 3, the secondary circuit 5 comprises in addition a capacitor 8 connected in parallel to the secondary winding 3 of the toroid 2. It should be noted that zener diodes or other equivalent devices will be advantageously used to prevent spurious tripping.

In the embodiment illustrated in FIG. 6a, the secondary circuit 5 comprises a tuning capacitor 13 connected in parallel with the secondary winding 3 of the toroid 2 and with a rectifier bridge P comprising elements 9–12 whose outputs are connected in parallel to a storage capacitor 14, which is connected in parallel with the relay 4 and a thyristor 15 mounted in series, and with a threshold circuit comprising a control output connected to the thyristor 15. The threshold circuit may comprise a comparator 16 or a voltage threshold diode 20 as shown in FIG. 6b.

For the first two embodiments of FIGS. 2 and 3, the tripping relay 4 commands tripping of the circuit breaker, when a fault current in the primary windings, exceeds a preset tripping threshold. When the voltage obtained on the secondary winding 3 does not present two symmetrical half-waves, the rectifier 6, 7 adjusts the current on the secondary winding, necessary for the polarized relay 4 to operate for two symmetrical thresholds.

In the third embodiment of FIGS. 6a and 6b, the threshold circuit supplies a tripping signal to the relay 14 via the thyristor 15, when the voltage at the terminals of the storage capacitor 14 exceeds a certain threshold.

In the embodiment illustrated in FIG. 2, operation of the trip device D with a good sensitivity to pulsed currents can be obtained for example by using a nanocrystalline material presenting the following magnetic characteristics: $\Delta Bdyn$ (100mA t/cm)<0.6T, $\Delta B$ dyn max<0.7T and $\Delta Bdyn/^B<0.7$.

In FIG. 1, curve (a) represents the standard boundary establishing the tripping thresholds, in terms of the opening angle, according to the standard VDE 0684. Curve (b) represents the variation of the thresholds in terms of ($\alpha$) when a crystalline material (comprising 78% NI) is used for the magnetic core of the toroid 2 in a trip device (D) whose secondary circuit comprises a rectifier, whereas curve (c) represents the same variation for use of a nanocrystalline material in the same type of trip device.

Referring to FIG. 1, it can be seen that the use of a nanocrystalline material for the magnetic core of the toroid 2 in a secondary circuit 5 with rectifier enables differential tripping thresholds (S) to be obtained (curve c) in terms of the opening angle ($\alpha$) which are appreciably lower than those established by the standard boundary (curve a), for opening angles up to 135°.

Figure 5:
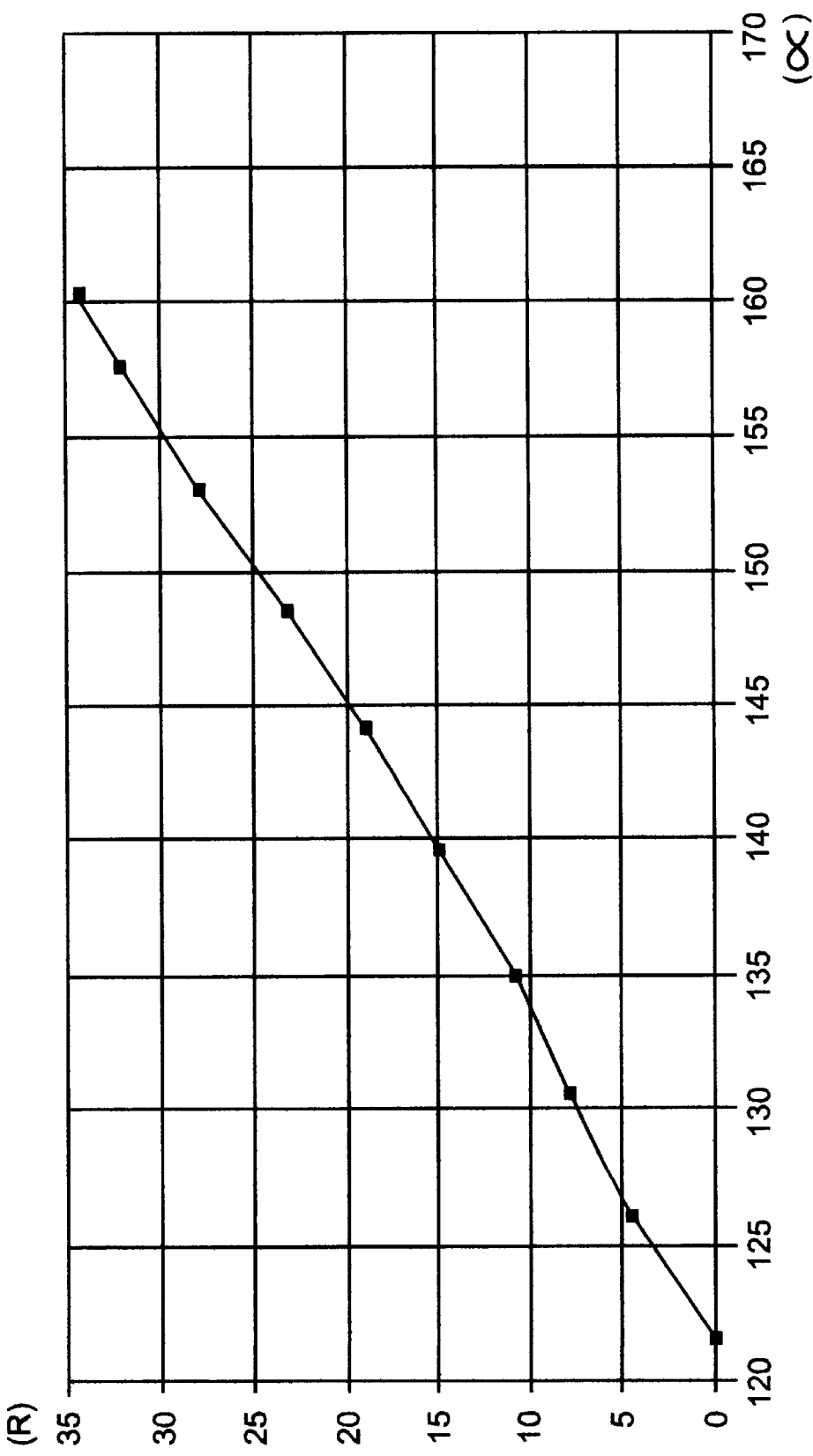
FIG. 5 illustrates the relative reduction of the thresholds in class A, achieved by the nanocrystalline compared to the crystalline according to the opening angle.

The reduced losses proper to nanocrystallines materials able to be highlighted by measurement of $\Delta B$ dyn in terms of the frequency enable a differential protection to be obtained with a widened opening angle ($\alpha$), as illustrated in FIG. 5. This curve represents on the y-axis the reduction of the thresholds (R) in %, in pulsed currents, achieved by use of nanocrystalline material compared with a crystalline material comprising 55% NI.

In the embodiments illustrated in FIGS. 3 and 6a and 6b, the capacitor 8 enables the power supplied to the relay 4 to be increased. The use of the nanocrystalline material enables sufficient energy to trip the relay 4 to be picked up and transmitted to the secondary winding 3. The secondary winding 3 and capacitor 8 form a resonant circuit whose resonance frequency is chosen in such a way that the voltage surge created by the capacitor 8 is about 3.5 times greater than that occurring without a capacitor. It can be noted that the voltage surge factor (f) is defined as being the ratio between the voltage of the capacitor 8 at a given frequency over the voltage at the terminals of the secondary winding 3, without a capacitor, for the same frequency. The resonance frequency is also chosen so that the pass-band of the filter comprising the capacitor does not chop the harmonics of frequency higher than 50 Hz present in the pulsed current signals too much, notably for $\alpha$=135°. When a crystalline material is used, this frequency is in general about 75 Hz.

Figure 4:
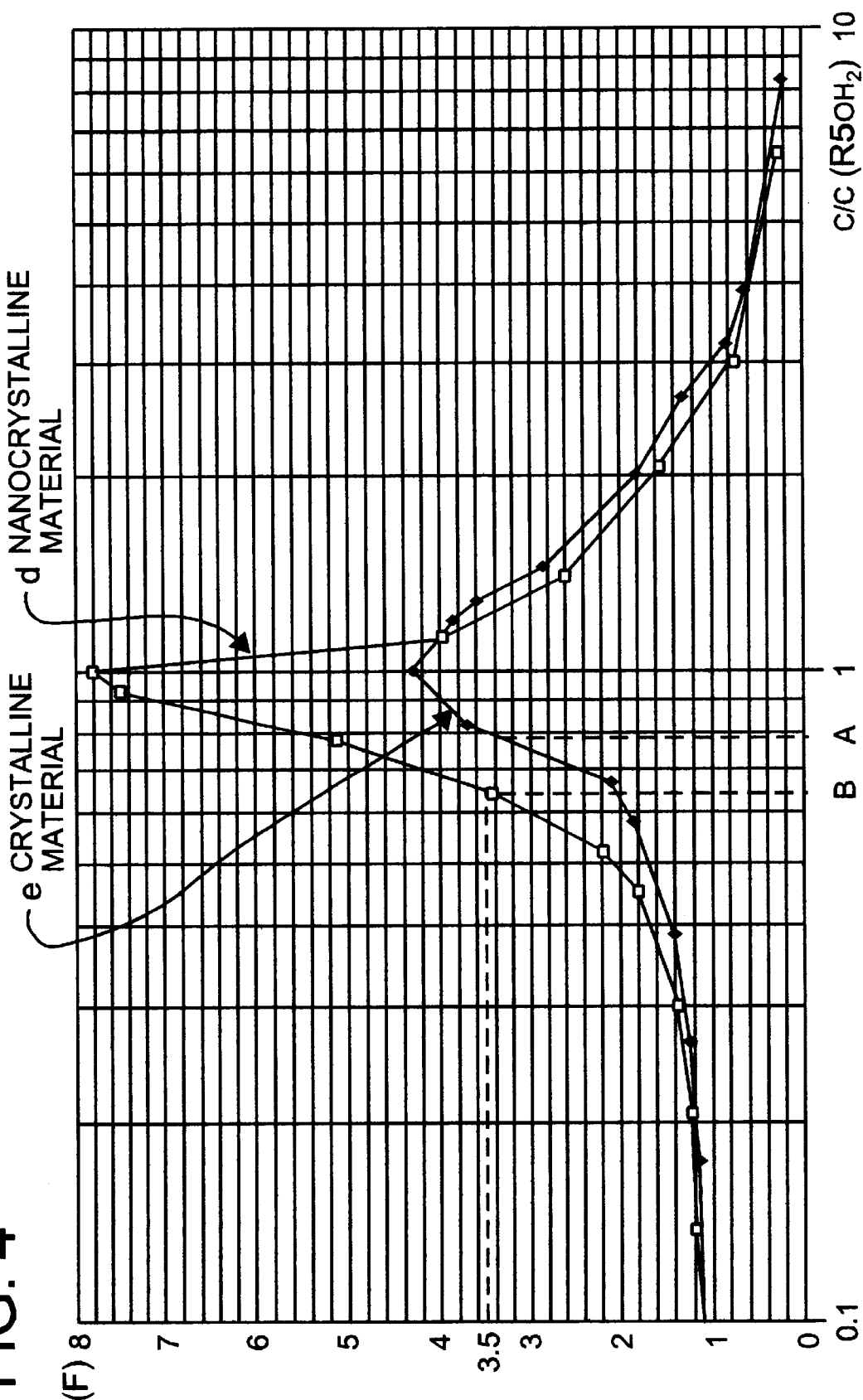
FIG. 4 illustrates two curves representing on the y-axis the voltage surge factor and on the x-axis the ratio C/C(50 Hz), respectively for a crystalline material and a nanocrystalline material.

When the material constituting the magnetic core is a nanocrystalline material, due to its low losses it generates a voltage surge twice that of a traditional crystalline material, as can be seen in FIG. 4. Curves d, e of this FIG. 4 represent on the y-axis the voltage surge factor f, and on the x-axis the ratio between the capacitance c of the capacitor and a capacitance value for a resonance of 50 Hz (C, 50 Hz), respectively for a nanocrystalline material (d) and for a traditional crystalline material (e). It can thus be seen on these curves that for a voltage surge coefficient value of 3.5, the corresponding quantity C/C (50 Hz) for a nanocrystalline B is lower than that A of the crystalline, which enables a resonance frequency of about 120 Hz to be chosen. This results in a widening of the differential pass-band, which enables a wider protection range to be achieved in class A (pulsed currents), i.e. for angles <135°$\alpha$<180° (these angles being present in certain graduators).

It can be noted that the magnetic core could advantageously be formed by a soft magnetic iron based alloy made up of at least 50% of crystallites of a size smaller than 100 nm and containing the following atomic percentage: in addition to an iron content greater than 60%, 0.5 to 2% of copper, 2 to 5% at least of one of the following metals, niobium, tungsten, tantalum, zirconium, hafnium, titanium and/or molybdenum, 5 to 14% of boron and 14 to 17% of silicon.

A differential protection device has thus been achieved enabling lowering of the pulsed current tripping thresholds to be achieved notably for opening angles α>135°, due on the one hand to the low losses characterizing nanocrystalline material and on the other hand to a widening of the passband of the assembly formed by the toroid and tuning capacitor.

Naturally, the invention is not limited to the embodiments described and illustrated which have been given as examples only.

On the contrary, the invention also comprises all the technical equivalents of the means described as well as their combinations if these are made according to the spirit of the invention.

What is claimed is:

1. A differential protection device for an electrical installation sensitive to pulsed currents, comprising
    (a) a differential transformer including a toroid having a magnetic core formed of nanocrystalline material, primary windings formed of the active conductors of the installation, and a secondary winding in which a fault signal is established when a differential fault occurs in said primary windings;
    (b) a tripping relay; and
    (c) means connecting said tripping relay with said secondary winding, said connecting means including a capacitor connected in parallel with said secondary winding to define a resonant circuit having a resonance frequency for generating said fault signal as a voltage surge for said relay and rectifier means wherein said rectifier means performs symmetrization of said pulsed current which responds to said fault signal in said secondary winding for activating said tripping relay, wherein said connecting means comprises in addition a storage capacitor and means for comparison, said comparison means being connected to the storage capacitor and comprising a monitoring output connected to a control means of the relay to supply a tripping signal to the relay if the value of the voltage of the storage capacitor is greater than a preset threshold.

2. The device according to claim 1, wherein said magnetic core is a soft magnetic iron based alloy, comprising more than 50% of fine crystal grains of a size smaller than 100 nm and, wherein the fine crystal grains comprise 63 to 78.5% of iron atoms, 0.5 to 2% of copper, 2 to 5% of at least one of the following metals, niobium, tungsten, tantalum, zirconium, hafnium, titanium, and/or molybdenum, 5 to 14% of boron and 14 to 17% of silicon; wherein the total quantity of these elements does not exceed 100%.

3. The device according to claim 1 wherein said rectifier comprises two diodes (6,7,) respectively connecting the two ends of the secondary winding (3) to one of the ends of said relay (4) whereas the other end of said relay (4) is connected to a mid-point (3a) of the secondary winding (3).

4. The device according to claim 3, wherein said two diodes (6,7) are two Zener diodes.

5. The device according to claim 1 wherein said rectifier comprises a diode bridge connecting the terminals of the secondary winding (3) to the terminals of the relay (4).

6. The device according to claim 1, wherein a voltage surge factor (f) of the connecting means (5) is about 3.5.

7. The device according to claim 6, wherein the resonance frequency of the resonant circuit comprising the secondary winding (3) of the toroid (2) and the parallel connected capacitor (8) is about 120 Hz.

8. The trip device according to claim 1, wherein said comparison means (16) comprise a comparator.

9. The trip device according to claim 1, wherein said comparison means (16) comprise a voltage threshold diode.

10. The trip device according to claim 1, wherein said control means of the relay (4) comprise a thyristor (15).

* * * * *